United States Patent [19]
Yokomoto et al.

[11] Patent Number: 5,768,386
[45] Date of Patent: Jun. 16, 1998

[54] METHOD AND SYSTEM FOR ENCRYPTING INPUT FROM A TOUCH SCREEN

[75] Inventors: Randal H. Yokomoto, Torrance; Warren Yung-Hang Tan, Thousand Oaks; Yosif Smushkovich, Santa Monica; Xuan S. Bui, Culver City; Michael Merman, Santa Monica; Inas M. Dessouky, Los Angeles; Cuong Do, Woodland Hills; Stephen M. Gryte, Los Angeles; Phoebe Rin-Rin Hsu, Northridge; Robert R. Propp, Corona Del Mar; Michael L. Sears, Torrance, all of Calif.

[73] Assignee: Transaction Technology, Inc., Santa Monica, Calif.

[21] Appl. No.: 655,922

[22] Filed: May 31, 1996

[51] Int. Cl.[6] .................................. H04L 9/00; H04L 9/10
[52] U.S. Cl. ........................................ 380/24; 380/25
[58] Field of Search ...................................... 380/24, 25

[56] References Cited

U.S. PATENT DOCUMENTS

| | | | |
|---|---|---|---|
| 5,157,717 | 10/1992 | Hitchcock | 379/96 |
| 5,162,783 | 11/1992 | Moreno | 340/712 |
| 5,184,115 | 2/1993 | Black et al. | 340/708 |
| 5,337,358 | 8/1994 | Axelrod et al. | 380/23 |
| 5,376,948 | 12/1994 | Roberts | 345/173 |
| 5,457,305 | 10/1995 | Akel et al. | 235/379 |
| 5,483,261 | 1/1996 | Yasutake | 345/173 |
| 5,544,086 | 8/1996 | Davis et al. | 364/408 |
| 5,564,974 | 10/1996 | Mazur et al. | 453/10 |
| 5,570,113 | 10/1996 | Zetts | 345/173 |
| 5,625,562 | 4/1997 | Veeneman et al. | 364/479.05 |

Primary Examiner—Thomas H. Tarcza
Assistant Examiner—Carmen D. White
Attorney, Agent, or Firm—Kilpatrick Stockton LLP; George T. Marcou

[57] ABSTRACT

An improved touch screen encryption device and method is disclosed. The user selects information from prompts displayed on a touch screen. The improved device determines the input information based upon the location of the touch. The device encrypts the information—for example, the user's personal identification number—and sends the encrypted information to a remote processor. The device and method may be used by a financial institution (such as a bank), a postal services institution or wherever sensitive information is input through a touch screen.

20 Claims, 3 Drawing Sheets

METHOD AND SYSTEM FOR ENCRYPTING INPUT FROM A TOUCH SCREEN

FIELD OF THE INVENTION

This invention relates to a method and system for inputting information on a touch screen device and encrypting the input for security reasons.

BACKGROUND OF THE INVENTION

Since their introduction in the early 1980's, the use of automated teller machines (ATM's) have fundamentally changed the way people bank. Individuals, for the first time, could perform a wide range of banking functions such as getting cash, depositing cash and checks and obtaining balance amounts on a 24 hour basis. In view of their wide user acceptance, ATM's have become an integral part of virtually every banks operations.

An important feature of ATM's is the user interface. One particularly popular interface has buttons positioned next to an electronic screen. Through the use of different screens and the buttons to the side of the screen, the user can relatively quickly and efficiently work through the screens to interact with the bank. One such systems is shown in U.S. Pat. No. RE 30,773 which is owned by the assignee of this application.

More recent interfaces enable a user to touch an electronic button on the screen itself. Such devices are often referred to as "touch screens." Touch screens generally comprise of electronic display, a series of emitters and sensors as discussed below and a processor associated with the touch screen device. Touch screens generally work by electronically locating where the user has touched the screen through sensors located along two sides of the screen, for example, one series of sensors along the right or left-hand side of the screen and another series of sensors along the bottom or top side of the screen. When the user's finger touches the screen the finger blocks emitters opposite the sensors and the sensors along the side of the screen record where the finger is located. By taking both inputs into account, the processor affiliated with the touch screen is able to determine the coordinates of the location of the finger and input such coordinates to the processor affiliated with the bank for future processing. In this respect, touch screens can be considered as "coordinate returning" device because they simply input the coordinates of the location of the user's finger to the bank's processor unit for further processing.

Touch screens increase flexibility because the user is not required to match up an input from the screen with a button to the side of the screen; rather the user simply touches the appropriate portion of the screen. Further, because the screen is configured electronically, the flexibility of the numbers and shapes of buttons shown on the screen is maximized. For example, keypads from a push button telephone can be shown on the screen, particularly when the user is asked to input the user's Personal Identification Number (PIN).

As users of ATM's are aware, the PIN is an alphanumeric code assigned by the bank to a user. By inputting the PIN as part of the interaction with the ATM. The user establishes that he or she is authorized to access the user's account or accounts. The bank's computing system checks the PIN entered by the user against the PIN authorized for the account and, if they match, the user is given access to the account. Conversely, if an individual attempts access to an account but is unable to provide the appropriate PIN, the computing system for the bank denies access. Thus, the PIN has become a widely recognized and important security feature for ATM's.

A difficulty may occur if the electronic signal going from the touch screen device to the bank's processing unit is intercepted by a third party. For example, by accessing such signals, the third party may determine the user's PIN and, in turn, later use that PIN to improperly access the user's account. Obviously it is in both the bank's and the user's best interests to deter such access and accordingly, there is a need in the industry to increase the security of user input through a touch screen device.

SUMMARY OF THE INVENTION

It is an object of the invention to overcome the shortcomings discussed above by a system and method for encrypting the input from a touch screen within the touch screen device itself.

Specifically, the improved device displays a PIN input screen to the user; the user inputs the user's PIN in the conventional manner (for example, by inputting a four-digit number on a conventional keypad—such as the zero to nine keys configured on a touch tone telephone—and then touching an "enter" button). The improved touch screen device does not send the coordinates of the user's input out of the device but rather collects the digits, encrypts them and, at the request of the bank's processing system, sends the encrypted values to the bank's processor.

The encryption is done by an encryption processor in the touch screen device. More specifically, the processor takes the digits and uses a computer program resident in the processor to convert the digits into a coded signal. The bank's processor has a related program to decode the signal and thereby determine the PIN. However, unauthorized third parties do not have access to the programs familiar with the code; accordingly, even if the coded message is intercepted by the third parties, the encoded signal will appear as "jibberish" to the third parties and the third parties will be unable to decode the PIN from the coded signal.

Although the examples given here are for a PIN and a bank, the invention can be used wherever user input of a confidential information over a touch screen is performed. This includes touch screens used by other types of financial institutions, automated post office machines and the like.

DETAILED DESCRIPTION OF THE PREFERRED EMBODIMENT

Figure 1:
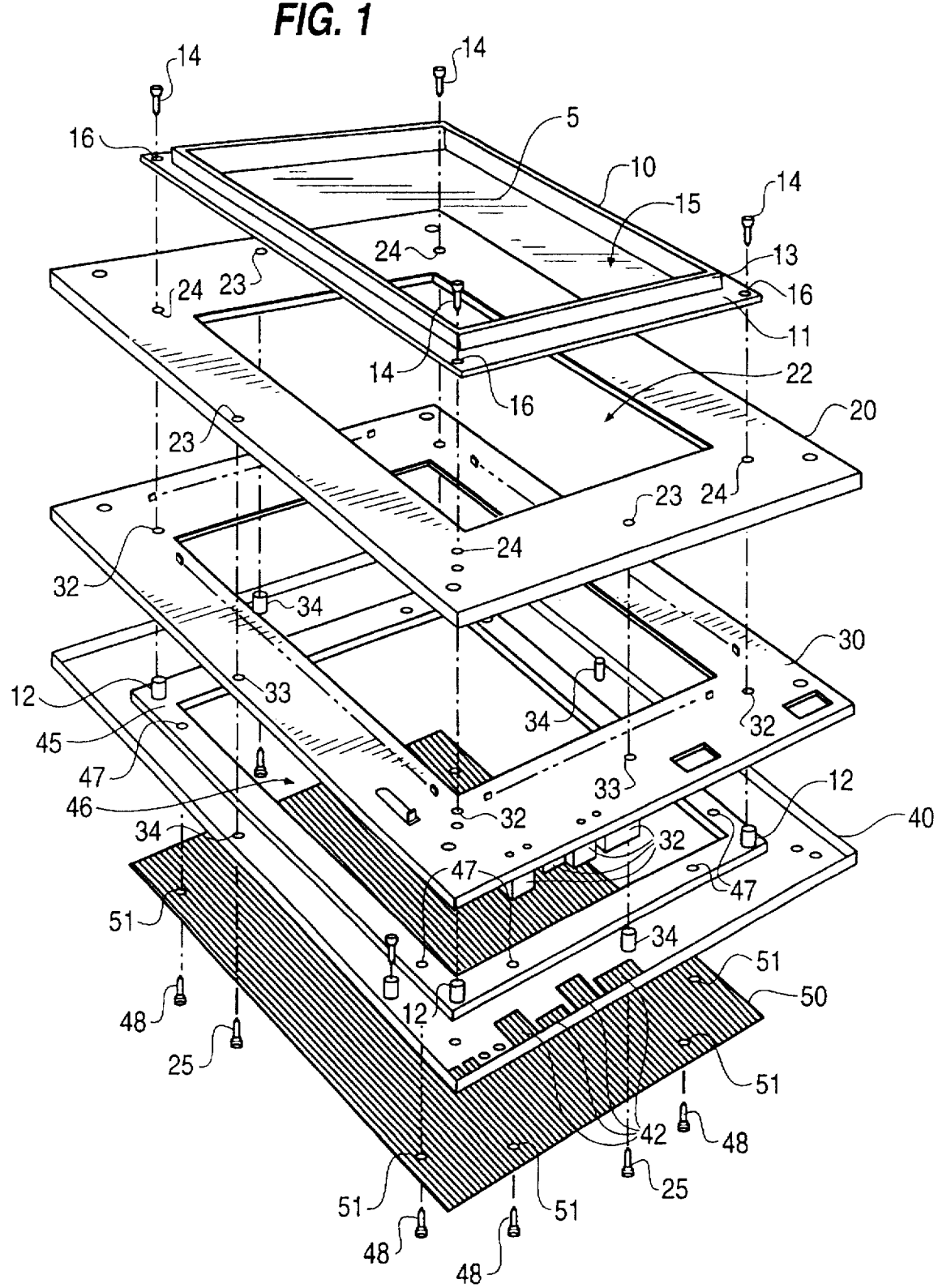
FIG. 1 depicts an exploded view of the protective covers.

FIG. 1 depicts an exploded view of the protective covers. The protective covers operate to protect the text of a user's entry onto the computer monitor from unauthorized viewing and access. The user's entries may include personal identification numbers (PIN), account information, and other personal data. As shown, the present invention includes five protective covers sandwiched together, one atop the other, to form a single thick protective cover over the perimeter of a computer monitor. The covers fasten securely together and includes tamper resistant architecture. In addition, the covers include a protective seal to show if there has been tampering.

A first protective cover 10 includes an optical bezel 5. An optical bezel is a protective cover and holder combination where a transparent inner portion is supported by an outer perimeter portion. The transparent inner portion may be of glass or crystal or any material known to one skilled in the art for permitting light passage therethrough while still offering physical protection of that which is located below the inner portion. The material is held in place by the holder which securely maintains the material. The cover portion of the bezel secures the holder atop the object surface being protected. As used in the invention, first protective cover 10 includes a protective cover portion 11 running the perimeter of cover 10. The cover portion 11 abuts a raised holder portion 13. Holder portion 13 defines an internal, approximately square first opening 15. Opening 15 is approximately the same size as the computer monitor being protected. In addition, holder portion 13 securely maintains a reinforced piece of opaque material, such as reinforced glass, the size of first opening 15 which covers the internal opening. Cover portion 11 also includes circular openings 16 situated approximately at the portion's corners. The circular openings accommodate first screws 14 which securely attach the entirety of first protective cover 10 to fourth protective cover 40 by screwing into housing 12 located on the fourth cover.

Second protective cover 20 is situated directly below the first protective cover. Second cover 20, like all covers, is composed of a hard substance which may include metal, plastic and the like. In addition, the second cover includes an internal approximately square opening 22 about the same size as the internal opening. Second cover 20 includes a first circular opening 24, approximately the same size and co-linear with circular opening 16. Like openings 16, first openings 24 accommodate first screws 14 to securely fasten the sensor cover to the fourth cover. In addition, first opening 24 serves to align second internal opening 22 with first internal opening 16. Second cover 20 includes a second circular opening 23 with internal threading (not shown). The internal threading accommodate a second set of screws 25. Second screws 25 also securely fasten the second cover to the fourth cover. The outer perimeter of second cover 20 extends beyond the outer perimeter of first cover 10 so as to provide additional support to the first cover and offer additional protection to the computer monitor below.

A printed circuit board 30 is situated directly below second cover 20. The third cover includes first circular opening 32 for accommodating first screws 114 to securely fasten the third cover to the fourth cover. In addition, first openings 32 are co-linear with first openings 16 and first openings 24 further aligning the third cover with the top two covers. The third cover includes a second set of circular openings 33 for accommodating second screws 25 and a raised surface 34 located on the fourth cover. Raised surface 34 comprised a hollow cylindrical tube rising up from the fourth cover. The inner diameter of the raised surface is sufficiently wide so as to accommodate second screws 25 therein. The outer diameter of raised surface 34 fits securely within second openings 33 thereby further aligning the third and fourth covers.

The fourth protective cover 40 is situated directly below the third protective cover. The protrudance of circuitry 32 from below the third cover is accommodated located directly below the circuitry on the fourth protective cover 40. In addition, the fourth protective cover includes housings 12 to accommodate the top mounted screws 14. Housing 12 are situated at the approximate inner corners of an interior defined approximate square opening 46. Opening 46 is approximately the same size as the internal openings of the other three corners. About the perimeter of opening 46 is a raised reinforced lip portion 45. Portion 45 provides additional support to the fourth cover as well as the other three covers and provide additional protection against unauthorized assess to circuit elements 37 from the internal openings. Portion 45 further includes circular openings 47 for accommodating screw 48 therein. Openings 47 include interior threads for securely fastening screw 48. Cover 40 further includes cylindrical hollow housing 44 located at the approximate midpoint of the length of each side of the cover. Housing 44 accommodates screws 25 therein and is aligned with openings 33 of board 30 and 23 of cover 20. Housing 44 is of a sufficient height so as to support board 30 in a level position with respect to cover 40.

The fifth protective cover 50 is situated directly below the fourth protective cover and directly above a computer monitor (not shown) which is being protected by the covers combination. The fifth cover is a blocking screen which limits the visibility of the computer monitor to only the person standing directly in front, perpendicular to the computer monitor. Anyone standing at an angle of more than 15 degrees from a perpendicular position from the computer monitor will not be able to see the screen because of the blocking action of the fifth cover. The fifth cover differs from the other covers in that the fifth cover is not made of a rigid solid material but rather of light permeating material arranged in a polarized-like fashion to limit light from the computer monitor. In addition, the fifth cover does not have an internal opening of approximately the shape and size of the computer monitor. Cover 50 is aligned directly below the inner openings of the top four covers. The alignment is maintained by circular holes 51 accommodating screws 48 therein.

Figure 2:
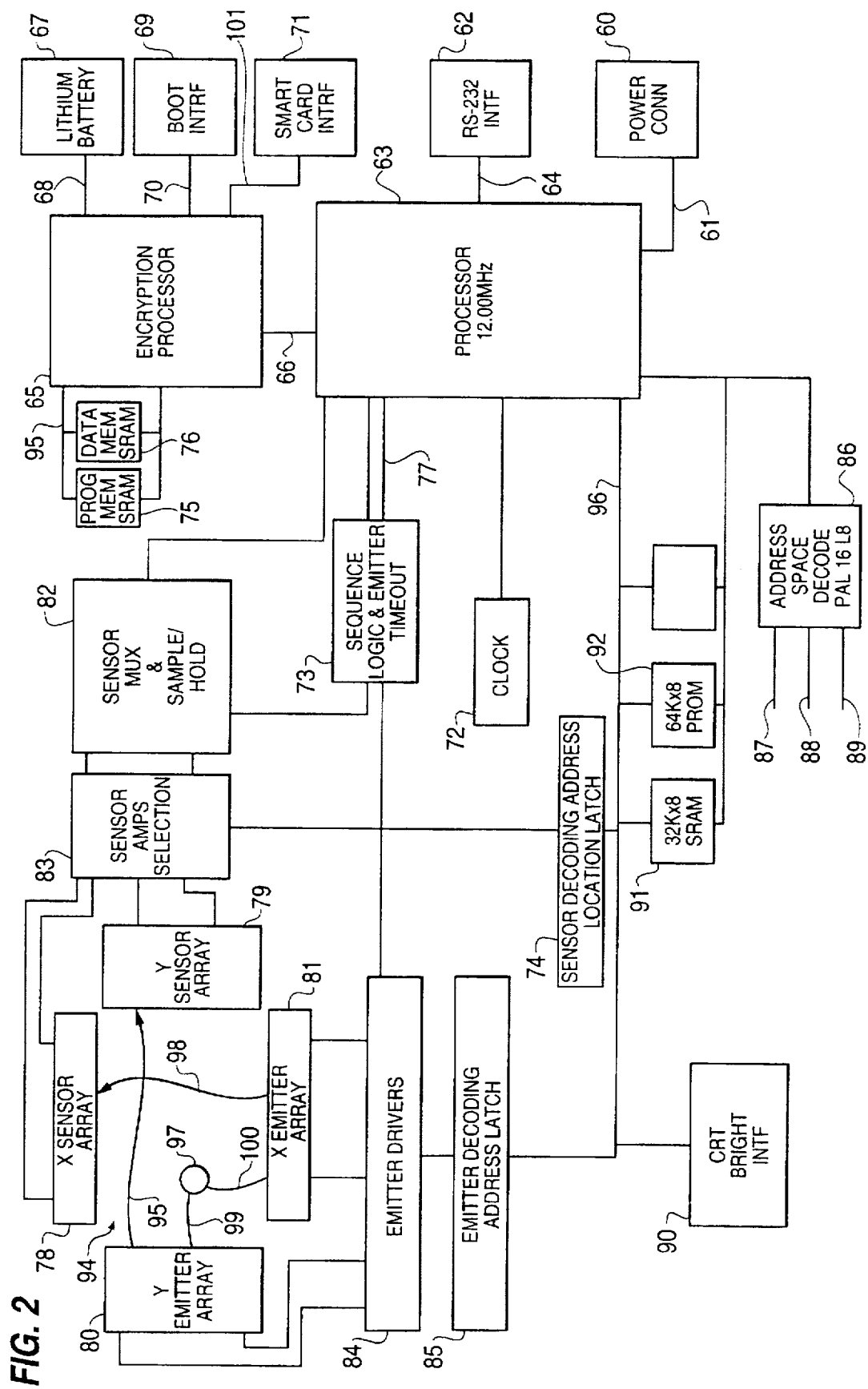
FIG. 2 depicts a schematic of the operation of the touch screen.

The operation of the circuit elements 37 located on the underside of cover 30 will now be described with general reference to the box diagram of FIG. 2. Circuit elements 37 are arranged on a circuit board in a design intended to accomplish the following functions. The circuit elements as laid out are intended to be illustrative and non-limiting. Likewise, equivalent circuit element known in the art to accomplish like tasks, may be substituted without departure from the scope of the invention.

The circuit board receives electric power from a power connector 60. Power connector 60 delivers power to the circuit elements of the circuit board through a line connection as depicted by line 61. The circuit board includes an interface 62 which communicates with a main processor 63 via a direct electrical connection as depicted by line 64. In addition, the interface communicates with and delivers incoming signals to the main processor 63. The main process can include any compute processor known to one skilled in the art to perform the tasks set out below. In addition, the main processor 63 controls the scanning operation performed on the computer monitor touch screen. Data read during the scanning process is fed to an encryption processor 65 via a direct electrical connection as depicted by line 66. The data to be encrypted generally refers to the user's personal identification number (PIN) that indicate to the system beings accessed who the user is.

One type of application during use of a touch screen, directs the user to initially enter his/her PIN number by pressing against the touch screen at locations corresponding to numbers on a computer generated keypad. The main processor determines the location of the user's touch, correlates the location with the numbers on the computer generated keypad and determines which numbers the user has entered. These numbers are then encrypted by the encryption processor.

The encryption processor, such as a Dallas DS5002, uses algorithms to encrypt the PIN as would be know to one skilled in the art and encrypts the PIN on an encrypted bytewide interface. DES is one such configuration scheme. Encryption programs and algorithms tend to be proprietary and are not intended to be limiting of the invention. A lithium battery 67, in electrical connection 68 with encryption processor 65, is used to maintain the algorithms and encryption programs used by the encryption processor. The algorithms and encryption programs are stored in a static random access memory computer storage unit (RAMs) 75, 76 so as to require the lithium battery, or equivalent, to keep the contents of the memory active in case of a general power failure. The static RAMs are in direct electrical connection with the encryption processor as depicted by line 95.

The circuit board includes a boot interface 69 in direct electrical connection with encryption processor 65 as depicted by line 70. The boot interface includes a set of programs onto the interface thereon during assembly of the circuit board, for operation of the encryption processor 65. In addition, encryption keys for the encryption processor are loaded, during assembly, through the boot interface. A smartcard interface 71 is also provided, where a smartcard can be able to communicate with encryption processor via direct connection 101.

A centrally located clock 72 provides the timing for the operation of the main and encryption processors when the two read and encode a PIN. In addition, the clock provides timing for data when it is multiplexed onto a buffer and stored in a memory unit. The clock operates in conjunction with a centrally located sequence logic and emitter time-out 73. A standard memory of 64K PROM 92 is used to store programs for use by the main processor. In addition, the main processor operates with 32K RAM 91 to enable efficient and speedy computer read-write operations. Both are in direct electrical connection with the main processor 63 as indicated by line 96.

The circuit element includes a pair of emitter arrays 81 and 80, located across from a pair of sensor arrays 79 and 79. The two pairs of elements form the sides of a square 94 about the same size as the computer monitor being protected and are positioned along the perimeter of the internal opening of cover 30. The emitter arrays include an array of controllable linear point radiation emitters which give off a particular type of radiation in controlled bursts. The radiation wavelength may correspond to any visible or invisible wavelength as may be envisioned by one skilled in the art, including infrared, ultraviolet, electrical and sonic. The emitter arrays 81 and 80 are positioned horizontally and vertically, respectively, defining an 'x' and 'y' axis in Cartesian coordinates 95. The emitter arrays are driven or powered by emitter drivers 84. Likewise, an emitter decoding address latch element 85 operates to provide the address or location of each of the emitters.

The sensor arrays include an array of point sensors positioned directly opposite the point emitters for detecting radiation therefrom. The sensor arrays 78 and 79 are positioned horizontally and vertically, respectively, also defining an 'x' and 'y' axis in Cartesian coordinates. The sensor arrays are driven or powered by sensor amplifiers 83 and are sampled and held (powered and read) by sample/hold element 82. Likewise, a sensor decoding address or location latch element 74 operates to provide the address and individual element decoding for the sensors. Element 82 samples and holds a detection signal from the sensor array and inputs this signal to the main processor. The main processor captures (reads) the signal from element 82, assigns a digital value to the signal and starts the comparison and analysis of the digital value with values of what the signal should be for normal and abnormal operation. For example, when a user presses on the touch screen, the presence of the user's finger causes an interruption in the flow of radiation from an emitter to its respective sensor. As shown in area 94, an uninterrupted radiation wave 95 flows from emitter array 80 to a sensor in sensor array 79. Likewise an uninterrupted radiation wave 98 flows from emitter array 81 to sensor array 78. A user's finger 97 depresses on the screen (not shown) and interrupts the flow of radiation waves 99 and 100. By determining which sensors are detecting a drop in radiation wave levels, the main processor 63 and address space decoder 86 can determine where the end user touched the screen. Finally, the brightness of the CRT screen is controlled by brightness control element 90. An address space decoding element 86 helps in the comparison and receives inputs along lines 87, 88 and 89 indicative of the sensor array, emitter array and CRT outputs, respectively.

Figure 3:
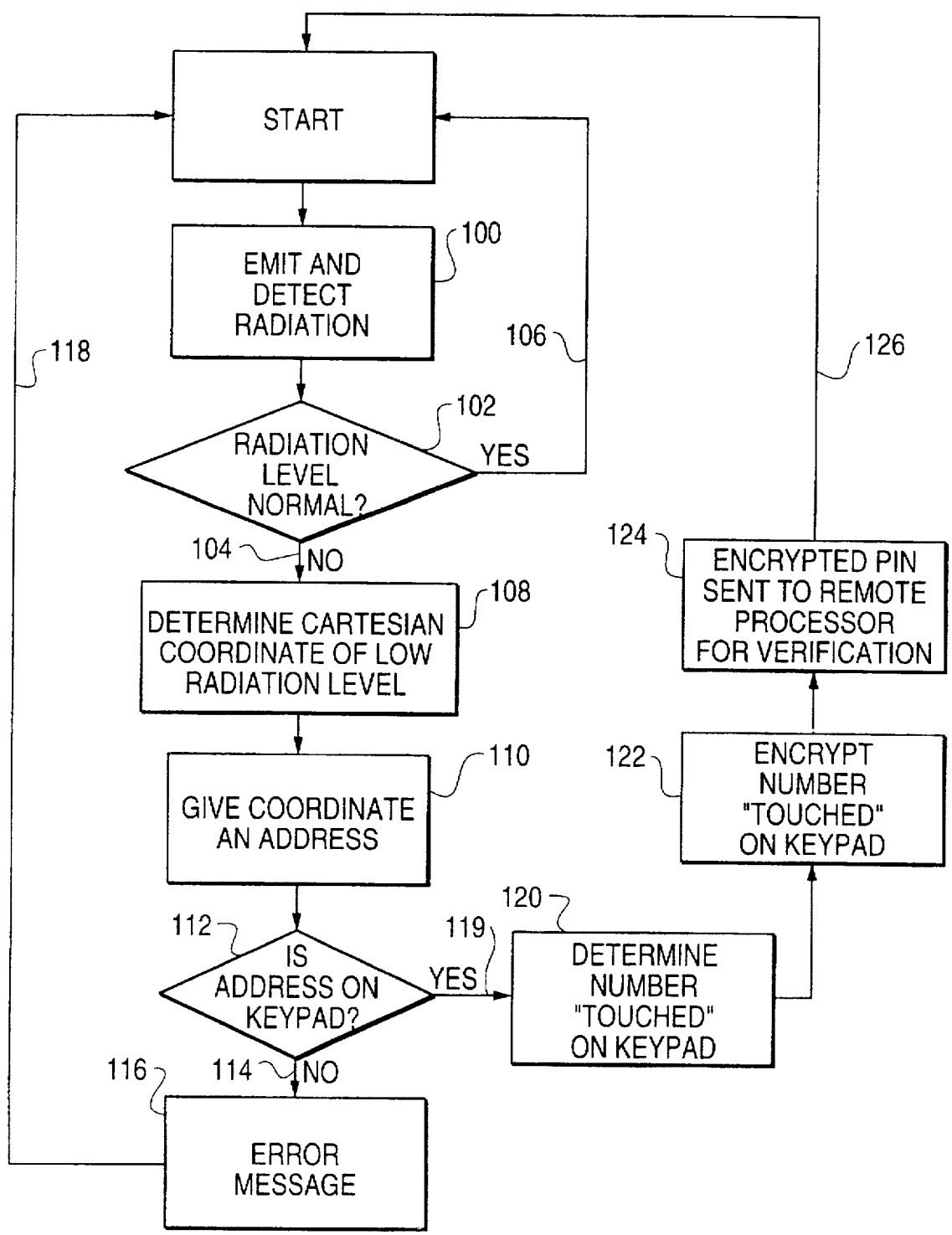
FIG. 3 depicts a flowchart of the operation of the present invention.

The operation of the present invention will be described with general reference to FIG. 3. In operation, the emitters are activated and emit a burst of radiation of specific frequency and intensity 100. The sensors are driven to sample and hold for a duration sufficient to detect the burst of radiation across the open internal opening defined by the square arrangement of the emitters and sensors. A typical time for a radiation scan is 50 microseconds per scan of infrared radiation. The central clock 72 provides time pulses to assist in performing this task. The emitters and sensors are then deactivated to prevent burn out of the two pairs of elements. The sensor pairs generate a signal in response to the intensity of radiation detected and this signal is assigned an address in the circuit boards memory. The main processor then determines if all the sensors of the array pair detected a radiation signal level equal to a normal level 102. A normal level means that nothing is blocking the radiation. Should something or someone temporarily block the radiation from an emitter to reach its respective sensor, the signal level would be reduced. This can happen when someone presses their finger against the computer monitor to enter their PIN number.

When a lower than normal signal is not detected 106, the emitter and sensor arrays are reactivated. When a lower than normal signal is detected 104 the Cartesian coordinates associated with the signal drop is then determined 108 and an address is assigned to the coordinate 110. Once the first coordinates are determined, they are compared 112 with coordinates associated with a computer generated keypad imaged on the computer monitor to determine which numbers the person using the machine entered onto the touch screen. Where it is determined that the coordinates do not correspond to any location of the touch screen keypad 114, an error message is displayed 116 and the operations depicted in FIG. 3 is restarted 118. Where it is determined that the first coordinates correspond to a position within the computer generated keypad 119, a determination of the number associated with the first coordinates is made 120. This number is encrypted and stored in memory 122. This process may be repeated until a plurality of numbers corresponding to the user's PIN have been entered. The encrypted signal is then sent to a remote processor such as a computing system affiliated with an institution 124. The remote processor decrypts the signal to determine the user PIN and then determines if the user is authorized to access the system. The system is then restarted 126.

Various preferred embodies of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention. Accordingly, the invention is only limited by the following claims.

We claim:

1. A method for an improved touch screen device for use with an associated terminal comprising of:

a user inputting information into a touch screen device having a tamper resistant touch screen device housing and at least one processor located within said tamper resistant touch screen device housing by touching a location on a touch screen in response to a prompt displayed on said touch screen;

said touch screen device determining the coordinates of said location by sensors associated with said touch screen device;

said touch screen device determining the input information associated with said location by said at least one processor located within said tamper resistant touch screen device housing;

said touch screen device encrypting the input information by said at least one processor located within said tamper resistant touch screen device housing; and said touch screen device sending said encrypted input information to a processing unit within said terminal so that said encrypted input information upon exiting said tamper resistant touch screen device housing is encrypted as it moves through said terminal.

2. The method of claim 1 wherein said terminal is associated with a financial institution.

3. The method of claim 1 wherein said terminal is an ATM.

4. The method of claim 1 wherein said tamper resistant touch screen device housing contains at least a first processor and a second processor and the determining step is done by said first processor associated with said touch screen device and said encrypting step is done by said second processor associated with said touch screen device.

5. The method of claim 1 wherein said sensors employ infrared light beams.

6. The method of claim 1 wherein the only input information which is encoded is the user's PIN.

7. The method of claim 1 wherein said prompt in said inputting step includes a keypad display.

8. The method of claim 7 wherein said input information includes a PIN consisting of three to twelve digits.

9. The method of claim 2 wherein said financial institution is a bank.

10. The method of claim 1 wherein said terminal is an automated postal services vending machine.

11. A system for an improved touch screen device for use with an associated terminal comprising:

said touch screen device including a tamper resistant touch screen device housing and at least one processor located within said tamper resistant touch screen device housing;

said touch screen device further including location sensing means for determining the location of a touch on a screen said touch being performed by said user in response to a prompt being displayed on said screen and said touch being associated with information displayed on said screen;

information determining means including at least one processor located within said tamper resistant touch screen device housing for determining the information based upon said location;

encrypting means including at least one processor located within said tamper resistant touch screen device housing for encrypting said information; and sending means for sending the encrypted information to a remote processor associated with said terminal so that said encrypted input information upon exiting said tamper resistance touch screen device housing is encrypted as it moves through said terminal.

12. The system of claim 11 wherein said terminal is associated with a financial institution.

13. The system of claim 11 wherein said terminal is an ATM.

14. The system of claim 11 wherein said tamper resistant touch screen device housing contains a first processor and a second processor and said information determining means includes said first processor and said encrypting means includes said second processor.

15. The system of claim 11 wherein said location sensing means employ infrared beams.

16. The system of claim 11 wherein the only information which is encoded is the user's PIN.

17. The system of claim 11 wherein said prompt includes a keypad display.

18. The system of claim 17 wherein said selected information is a PIN consisting of three to twelve digits.

19. The system of claim 12 wherein said financial institution is a bank.

20. The system of claim 11 wherein said terminal is an automated postal services vending machine.

* * * * *